United States Patent [19]
Adams et al.

[11] Patent Number: 5,734,380
[45] Date of Patent: Mar. 31, 1998

[54] METHOD FOR CONTROLLING THE PRESENTATION OF DISPLAYS IN A MULTI-WINDOW COMPUTER ENVIRONMENT

[76] Inventors: James S. Adams, 509 E. Utopia Rd., Phoenix, Maricopa County, Ariz. 85024; Donald W. Moore, 2901 E. Friess Dr., Phoenix, Maricopa County, Ariz. 85032; James C. Huntington, 6141 N. 16th Dr., Phoenix, Maricopa County, Ariz. 85015; Richard C. Holland, 4425 E. Monte Cristo Ave., Phoenix, Maricopa County, Ariz. 85032

[21] Appl. No.: 720,364

[22] Filed: Sep. 27, 1996

[51] Int. Cl.$^6$ .................................................. G06F 15/00
[52] U.S. Cl. ........................ 345/340; 345/339; 345/342; 345/348; 345/349
[58] Field of Search ........................ 345/329, 330, 345/331, 332, 333, 334, 339, 340, 342, 343, 348, 349, 352, 353

[56] References Cited

U.S. PATENT DOCUMENTS

5,487,143  1/1996  Southgate .................. 345/340

*Primary Examiner*—Mark R. Powell
*Assistant Examiner*—Huynh Ba
*Attorney, Agent, or Firm*—Arthur A. Sapelli; Anthony Miologos

[57] ABSTRACT

In a display system having a display surface of one or more physical surfaces, a method controls the presentation of application displays in a multi-window computer environment wherein multiple application displays are displayed. Further, any application display requested to be displayed is caused to be displayed by the method in one of the multi-windows in response to an operator select action. The method comprises the steps of outputting selectable options for each window as specified in a configuration file. The configuration file defines window properties for each window of the multi-window display. The selectable options provide indications of where application displays are to be presented. The option selected is read by the Workspace Management System. The application display is outputted to conform with the option selected, the option indicating the replacement of current application displays with subsequent application displays.

3 Claims, 9 Drawing Sheets

METHOD FOR CONTROLLING THE PRESENTATION OF DISPLAYS IN A MULTI-WINDOW COMPUTER ENVIRONMENT

RELATED APPLICATIONS

The present application is related to the following:

1. Patent application Ser. No. 08/720,340, entitled "A Method for Configuring and Controlling Computer Windows' Display of Multiple Applications";

2. Patent application Ser. No. 08/720,347, entitled "A Method of Display Categorization in a Multi-Window Display Environment";

3. Patent application Ser. No. 08/720,349, entitled "A Method for Re-Invoking Previously Displayed Software Application Displays in a Multi-Window Environment";

4. Patent application Ser. No. 08/720,345, entitled "A Method for Constraining the Number of Displays in a Multi-Window Computer Environment";

5. Patent application Ser. No. 08/720,346, entitled "A Method for Constraining the Available Display Surface in which Application Displays May be Rendered";

6. Patent application Ser. No. 08/720,348, entitled "A Method for Configuring the Display Properties to be Applied to Predetermined Application Displays"; and all of the above being incorporated by reference herein, and all of the above filed on even date herewith, and all of the above assigned to Honeywell Inc., the assignee of the present application.

BACKGROUND OF INVENTION

The present invention relates to a display system, and more particularly, to a method of controlling the presentation of displays in a multi-window computer environment.

The present invention is based on a concept which allows the user to think of a set of windows on his/her display as a set of "soft screens," or "viewports," any of which can be selected in which to display the next application. Whereas input focus (a standard computer window concept) describes to which window the input from a keyboard or mouse, etc., goes, the concept of output focus describes in which soft screen (window) the next application display will be presented. The selected soft screen is the output focus window. Further, multiple kinds of displays can be differentiated into "window groups," each of which can have its own output focus. The concept of "global output focus" allows the system and user to select a soft screen which is ensured to receive the next display, even if that display normally is not associated with the window group of which the select soft screen is configured to be a part. Additionally, any soft screen window can be "locked" such that the application display contents within this soft screen window are protected from being replaced by another display. Such a lock disallows the window to be reused by another application and protects the display so that only the owning application can update its contents.

The present invention provides the user (human or programmatic) with a method of exempting one or more display windows from having their contents replaced by another application display. The present invention also includes controls available to users in the form of button-indicators associated with each soft screen window. These button-indicators allow users to observe the current output foci and to set them by selection of the button-indicators. Also new and different is the "lock" concept, which is likewise accompanied by button-indicators associated with soft screen windows. These lock buttons allow displays to be protected from replacement by other displays within the context of an automated window management system which is configured to automatically replace existing displays according to some replacement scheme (such as FIFO, round robin, . . . ). The concepts of soft screen locking, output focus, and global-output focus, embedded in the embodiment of the present invention represent powerful new techniques in human/computer interaction, allowing the user to have a high degree of control over application display placement within the constructs of a managed human/computer multiple-display environment.

SUMMARY OF THE INVENTION

Therefore, there is provided by the present invention a method for controlling the presentation of displays in a multi-windowed computer environment. In a display system having a display surface of one or more physical surfaces, a method controls the presentation of application displays in a multi-window computer environment wherein multiple application displays are displayed. Further, any application display requested to be displayed is caused to be displayed by the method in one of the multi-windows in response to an operator select action. The method comprises the steps of outputting selectable options for each window as specified in a configuration file. The configuration file defines window properties for each window of the multi-window display. The selectable options provide indications of where application displays are to be presented. The option selected is read by the Workspace Manager System. The application display is outputted to conform with the option selected, the option indicating the replacement of current application displays with subsequent application displays.

Accordingly, it is an object of the present invention to provide a method for controlling the presentation of displays in a multi-window computer environment.

It is another object of the present invention to provide a method for controlling the presentation of displays in a multi-window computer environment whereby the operator can optionally exempt one or more display windows from having their contents replaced by another application display.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 7, which comprises

DETAILED DESCRIPTION

Figure 1:
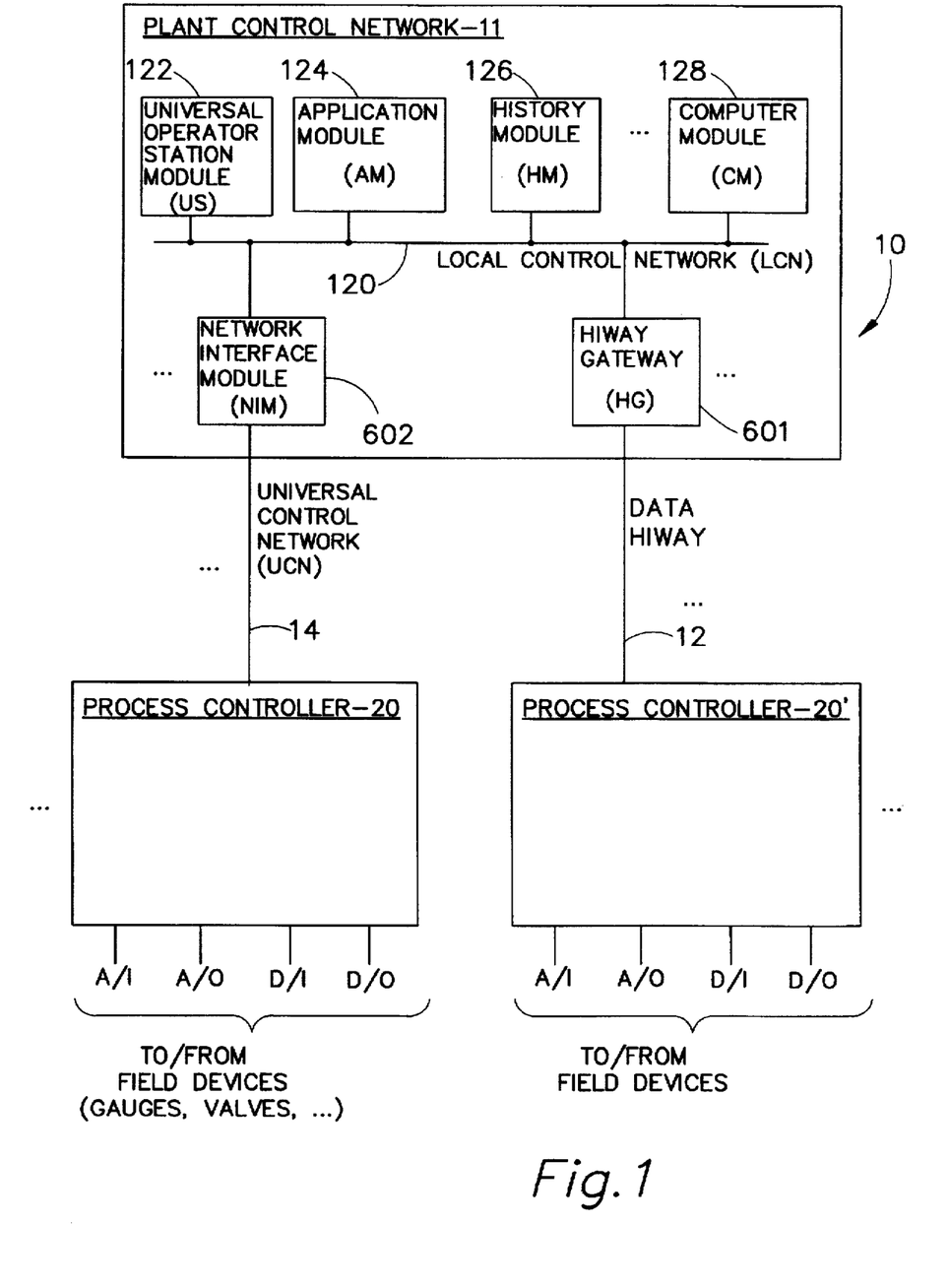
FIG. 1 shows a block diagram of a process control system of the preferred embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data hiway 12, which permits a process controller 20' to be connected thereto. In the present day process control system 10, additional process controllers 20' can be operatively connected to the plant control network 11 via a corresponding hiway gateway 601 and a corresponding data hiway 12. A process controller 20, an interface apparatus which includes many new additions, improvements, and features over the process controller 20', is operatively connected to the plant control network 11 via a universal control network (UCN) 14 to a network interface module (NIM) 602. In the preferred embodiment of the process control system 10 additional process controllers 20 can be operatively connected to the plant control network 11 via a corresponding UCN 14 and a corresponding NIM 602. The process controllers 20, 20' interface the analog input and output signals and digital input and output signals (A/I, A/O, D/I, and D/O respectively) to the process control system 10 from the variety of field devices (not shown) of the process being controlled which include valves, pressure switches, pressure gauges, thermocouples, . . . .

The plant control network (or more simply network) 11 provides the overall supervision of the controlled process in conjunction with the plant operator and obtains all the information needed to perform the supervisory function and includes an interface with the operator. The plant control network 11 includes a plurality of physical modules (or nodes), which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120, which permits each of these modules to communicate with each other as necessary. The NIM 602 and HG 601 provide an interface between the LCN 120 and the UCN 14 and the LCN 120 and the data hiway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a workstation for one or more plant operators.

A history module (HM) 126 provides mass data storage capability. The history module 126 includes at least one conventional disk mass storage device, such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules . . . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of network 11 and the units of such modules over the LCN 120 and the units of process control subsystems 20, 20' via the hiway gateway module 601, and the NIM 602, respectively. Data processing systems of a computer module 128 are used to provide supervisory, optimization, generalized user program preparation, and execution of such programs in higher-level program languages. Typically, the data processing systems of a computer module 128 have the capability of communicating with other such systems by a communication processor and communication lines.

The local control network 120 (LCN) is a high-speed, bit serial, dual redundant communication network that interconnects all the physical modules of plant control network 11. LCN 120 provides the only data transfer path between the principal sources of data, such as hiway gateway module 601, application module 124, and history module 126, and principal users of such data, such as universal operator station module 122, computer module 128, and application module 124. LCN 120 also provides the communication medium over which large blocks of data, such as memory images, can be moved from one physical module, such as history module 126, to universal station module 122. LCN 120 is dual redundant in that it consists of two coaxial cables that permit the serial transmission of binary signals over both cables.

Figure 2:
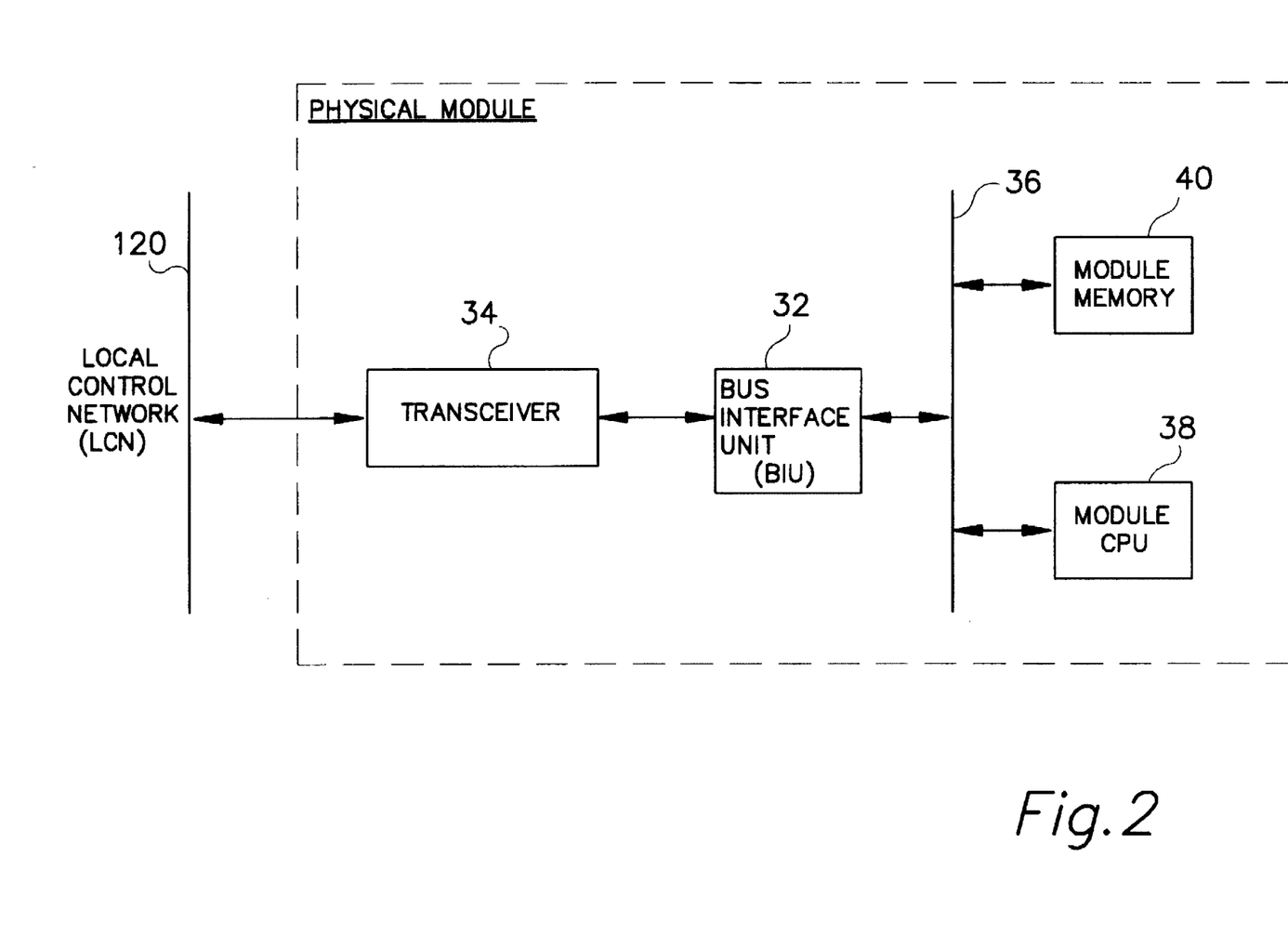
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for example. The data-processing capabilities of each module's CPU 38 and module memory 40 create a distributed processing environment which provides for improved reliability and performance of network 11 and process control system 10. The reliability of network 11 and system 10 is improved because, if one physical module of network 11 fails, the other physical modules will remain operational. As a result, network 11 as a whole is not disabled by such an occurrence as would be the case in centralized systems. Performance is improved by this distributed environment in that throughput and fast operator response times result from the increase computer processing resources and the concurrency and parallelism of the data-processing capabilities of the system.

As mentioned above, each physical module includes the BUS interface unit (BIU) 32, which is connected to the LCN 120 by the transceiver 34. Each physical module is also provided with the module BUS 36 which, in the preferred embodiment, is capable of transmitting 16 bits of data in parallel between the module CPU 38 and the module memory 40. Other units, utilized to tailor each type of physical module to satisfy its functional requirements, are operatively connected to module BUS 36 so that each such unit can communicate with the other units of the physical module via its module BUS 36. The BIU 32 of the physical module initiates the transmission of data over LCN 120. In the preferred embodiment, all transmissions; by a BIU 32 are transmitted over the coaxial cables which, in the preferred embodiment, form the LCN 120.

Figure 3:
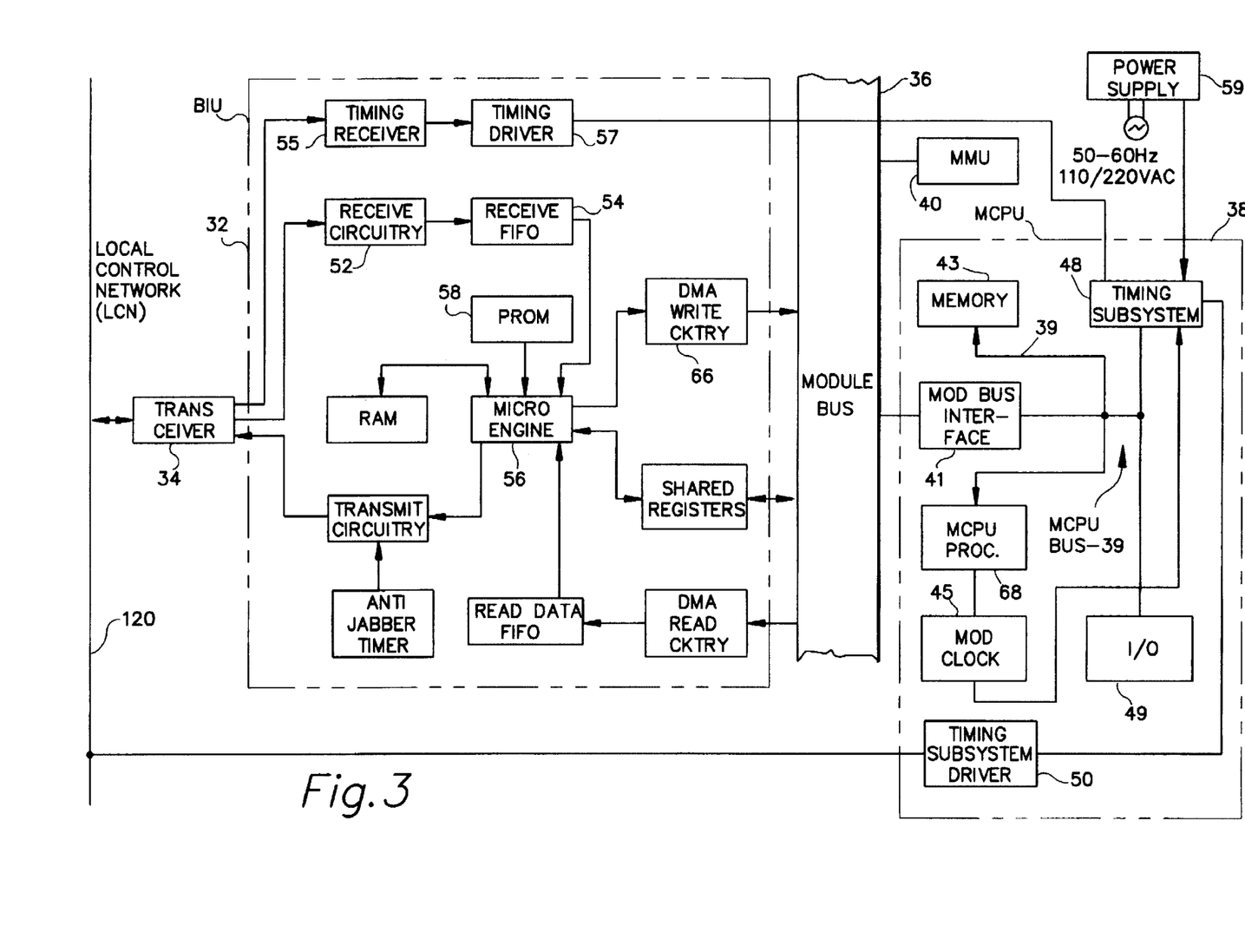
FIG. 3 shows a functional block diagram of a typical physical module of the process control system.

Referring to FIG. 3 there is shown a functional block diagram of a typical physical module 122, 124, 126, 128 of the plant control network 11, and includes the BUS 32 and the transceiver 34, which connects BIU 32 to the LCN 120. BIU 32 is capable of transmitting binary data over LCN 120 and of receiving data from LCN 120. Transceiver 34, in the preferred embodiment, is transformer coupled to the LCN 120. In the preferred embodiment, the LCN 120 is a dually-redundant coaxial cable with the capability of transmitting bit serial data. BIU 32 is provided with a very fast micro-engine 56. In the preferred embodiment, micro engine 56 is made up of bit slice components so that it can process eight bits in parallel and can execute a 24 bit microinstruction from its programmable read only memory (PROM) 58.

Signals received from the LCN 120 are transmitted by transceiver 34 and receive circuitry 52 to receive FIFO register 54. Micro engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module BUS 36.

Communication between MCPU processor 68, a Motorola 68020 microprocessor in the preferred embodiment, and other functional elements of MCPU 38 is via local microprocessor BUS 39. Module BUS interface element 41 provides the communication link between local BUS 39 and module BUS 36. Processor 68 executes instructions fetched from either its local memory 43, in the preferred embodiment an EPROM, or from MMU 40. Processor 68 has a crystal controlled clock 45 which produces clock pulses, or timing signals. Input/output (I/O) port 49 provides communication between MCPU 38 and equipment external to the physical module to permit program loading and the diagnosis of errors, or faults, for example.

Each MCPU 38 includes a timing subsystem 48 which, in response to clock signals from module clock 45, produces fine resolution, synchronization, and real-time, timing signals. Any timing subsystem 48, which is provided with a timing subsystem driver 50, has the capability of transmitting timing information to other physical modules over the LCN 120. Another input to each timing subsystem 48 is timing information which is transmitted over LCN 120 and which is received through transceiver 34, timing receiver 55, and timing driver 57 of BIU 32. Timing pulses from module power supply 59, which are a function of the frequency of the external source of A.C. electric power applied to power supply 59, are used by timing subsystem 48 to correct longer-term frequency drift of the clock pulses produced by clock 45.

Additional information of the BIU 32 can be found in U.S. Pat. No. 4,556,974. A more detailed description of the process control system 10 can be had by referring to U.S. Pat. No. 4,607,256. Additional information of the individual, common, functional blocks of the physical modules can be had by reference to U.S. Pat. No. 4,709,347, all of the above-identified patents being assigned to the assignee of the present application; and additional information of the process controller 20' can be had by referencing U.S. Pat. No. 4,296,464.

The addition of an interface apparatus which interfaces other systems to the process control system 10 described above and a modification to a graphics generator in the US 122 opens up the existing system, specifically the graphics interface, which includes designing-in the capability to readily permit nodes of differing designs to communicate to the network. In order to open up the graphics interface such that a display which is not on the LCN can be displayed onto the CRT 151 of the US 122, there is included an interface to a graphics card of the US 122 from a co-processor. For more detailed information regarding the opening of the graphics interface, reference can be made to U.S. Pat. No. 5,386,503, entitled "Method for Controlling Window Displays in an Open Systems Windows Environment," and to U.S. Pat. No. 5,530,844, entitled "Method of Coupling Open Systems to a Proprietary Network," both patents being assigned to the same assignee of the present application.

Figure 4:
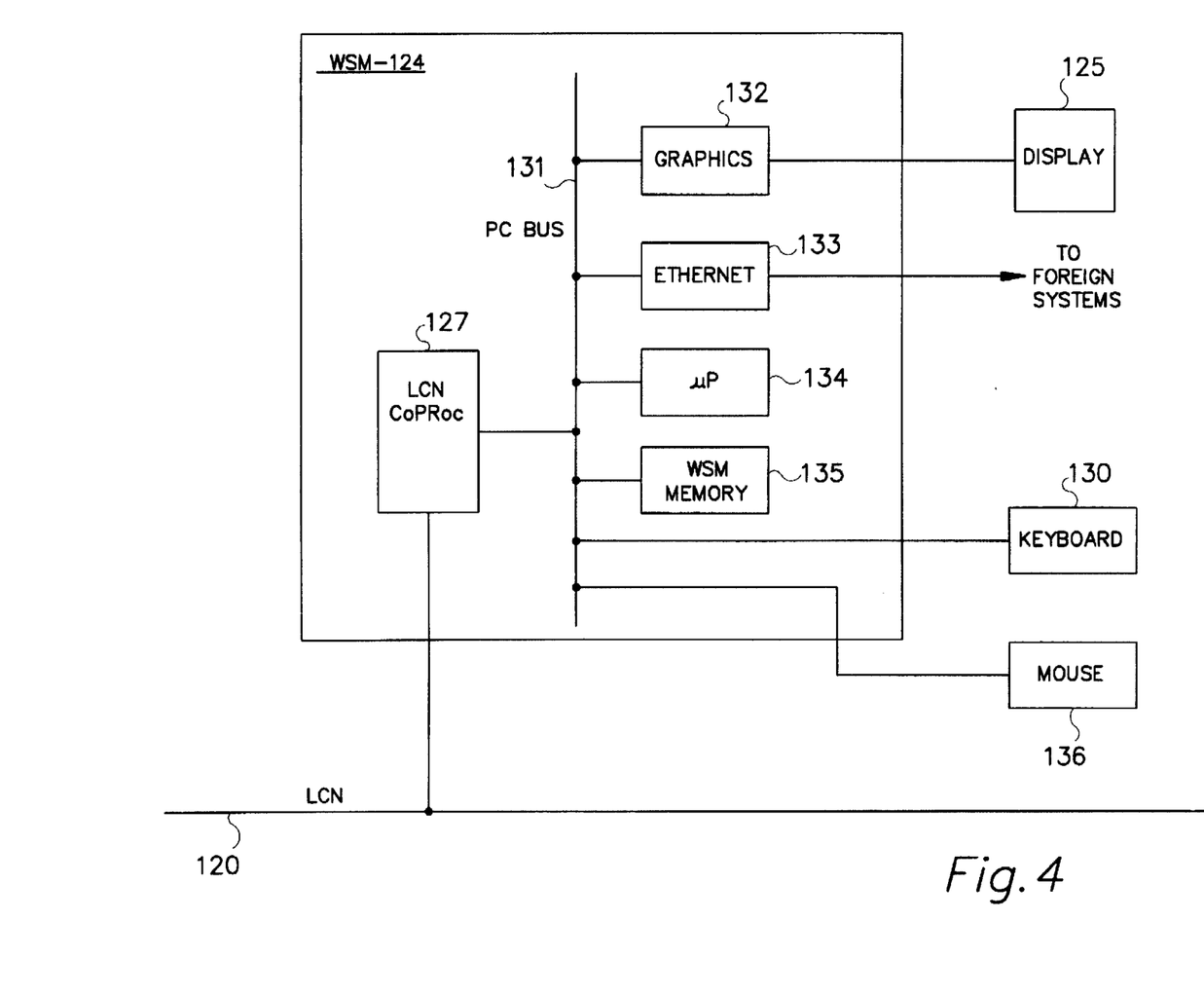
FIG. 4 shows a block diagram of a Workspace Manager Display System of the preferred embodiment.

The display system which incorporates the method of the present invention will now be described. Referring to FIG. 4, there is shown a block diagram of a Workspace Manager (WSM) Display System of the preferred embodiment of the present invention. The Workspace Manager Display System, or more simply referred to as Workspace Manager 124, is coupled to the LCN 120 of the process control system 10 in the preferred embodiment. The Workspace Manager (WSM) 124 is a personal computer (PC) which can be purchased in the marketplace, and includes an LCN co-processor 127 coupled to the LCN 120 and to an internal BUS (PCBUS) 131 of the PC (i.e., of the WSM 124). The LCN co-processor 127 includes the BIU 32, the module BUS 36, the module CPU 38, and the module memory 40, described above. This configuration permits the WSM 124 to communicate with the LCN 120 and the nodes connected thereto. The WSM 124 includes a graphics card 132 coupled to a display 125 and to the PC BUS 131. An Ethernet card 133 permits the WSM 124 to communicate with foreign systems (i.e., systems not coupled to the LCN 120). A microprocessor (µp) 134 of the PC is coupled to the PC BUS 131 and executes the Windows NT Operating System and the Workspace Manager software. A WSM memory 135 is also coupled to the PC BUS 131 and stores the various information (including a configuration file, which will be described later) for use by the µp 134. A keyboard 130 is included for inputting commands to the WSM 124. A mouse interface 136 is provided in the preferred embodiment of the WSM 124.

Figure 5:
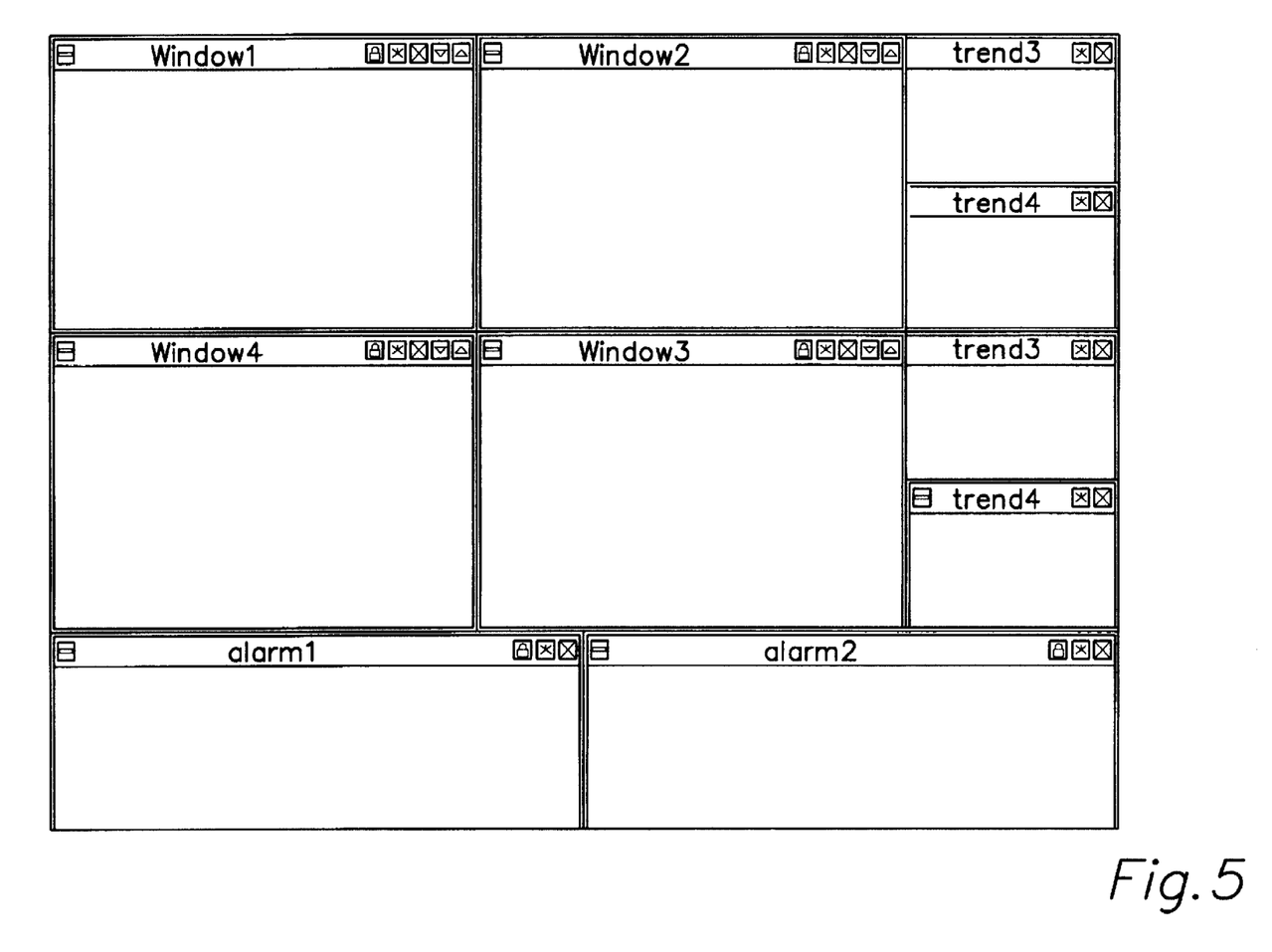
FIG. 5 shows the layout of an example configuration of a display of the Workspace Manager System (WSM), each window representing a different set of configured display characteristics, including but not limited to, the shown window locations and sizes.

In order to display a number of windows in an orderly, controlled manner, the display 125 is configured (or mapped) in a predetermined manner. Referring to FIG. 5, there is shown an example of a configuration of a display screen (not shown), sometimes referred to as a display surface, of display 125 of WSM 124. The display screen (or workspace) is divided into three categories: schematics, trends, and alarms. This workspace is configured as follows:

Schematics are limited to the region in which the four initial windows are displayed.

Trends are positioned along the right side of the workspace in fixed locations.

Alarms are presented at the bottom of the display.

In the preferred embodiment, the schematic invocation never results in the removal of alarm or trend display and vice versa. In the title area, note that the normal windows functions, such as MIN, MAX, . . . , features are included.

In the microprocessor 134 of WSM 124 there is operating a workspace management program (i.e., software) which in the preferred embodiment is a Windows NT, provided by the Microsoft Corp., which has been modified as will be described hereinunder. In order to achieve the configuration as shown in FIG. 5, a window specification file (sometimes referred to as a configuration file) is provided to the workspace management software. The window specification is a set of window properties which can be applied to one or more real-application windows during runtime. Some of these properties, such as position, relate to existing windows concepts. Other properties, such as region and draggable, represent extended means of controlling application windows. A plurality of window specifications can be included in a given workspace configuration. At runtime, once the workspace manager associates a real-application window with a particular window specification, that specification's properties are applied and enforced for that application window. This will be further described hereinunder.

Figure 6:
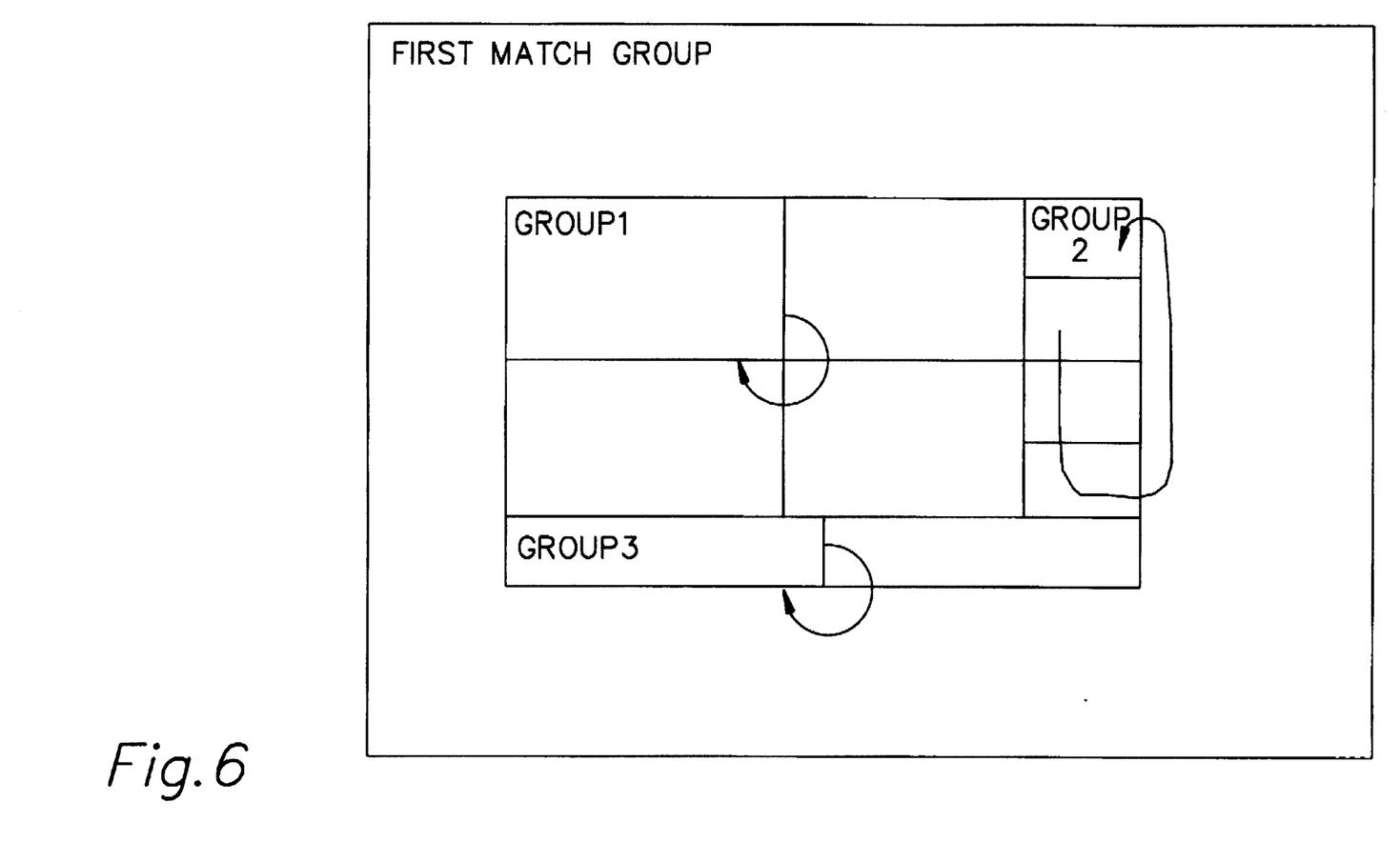
FIG. 6 shows an example ordering by which a newly-invoked application display area is related to a specific set of display characteristics for the example of FIG. 5.

In accordance with the examples shown above, FIG. 6 shows the workspace groups and how the space is selected by the workspace manager program. The window specifications are organized into logical window groups for each workspace configuration. Each workspace configuration consists of a single top-level group, consisting of one or more window specifications, and/or subgroups. Thus, a hierarchy of window groupings is possible. Each window group must be configured with one of three possible strategies for searching the matching window specification. Each of these strategies embodies a unique approach to determining the criteria by which a given application display will be managed and providing a new kind of functionality which is included as part of this invention: The automatic replacement of existing displays by newly-invoked displays (determining which existing display is to be replaced with a newly invoked display). A round-robin group uses a "round robin" approach in selecting which of its window specifications is applied to a given application window. This group is intended to support a cyclical replacement style in which the newest application window appears to replace the oldest one. All window specifications of this type of group share a common match expression so that a similar set of applications can easily match to each window in a group. Therefore, the match expression concept is applied at the group level for the round-robin groups. A "manual-select" group is similar to the round-robin group in that all applications displayed in this group share a common match expression; however, this group does not automatically increment the window specification which should be used to manage the next application display which matches the group's match expression. Rather, the system allows the user to manually select where the next application display will appear, and all newly-invoked applications which belong to this group will continue to replace the manually-selected application until another application is manually selected. Applications are "selected" for replacement via special title-bar buttons which are included as part of this invention. The "first match" group is designed to search its list of subgroups and window specifications in a "top-down, depth-first" fashion. All items in this group, including individual window specifications, each have their own match expression. In the preferred embodiment, all three groups of the example of FIG. 5 are of the round-robin group type and is so indicated in the window specification file (or sometimes called herein configuration file).

Figure 7A:
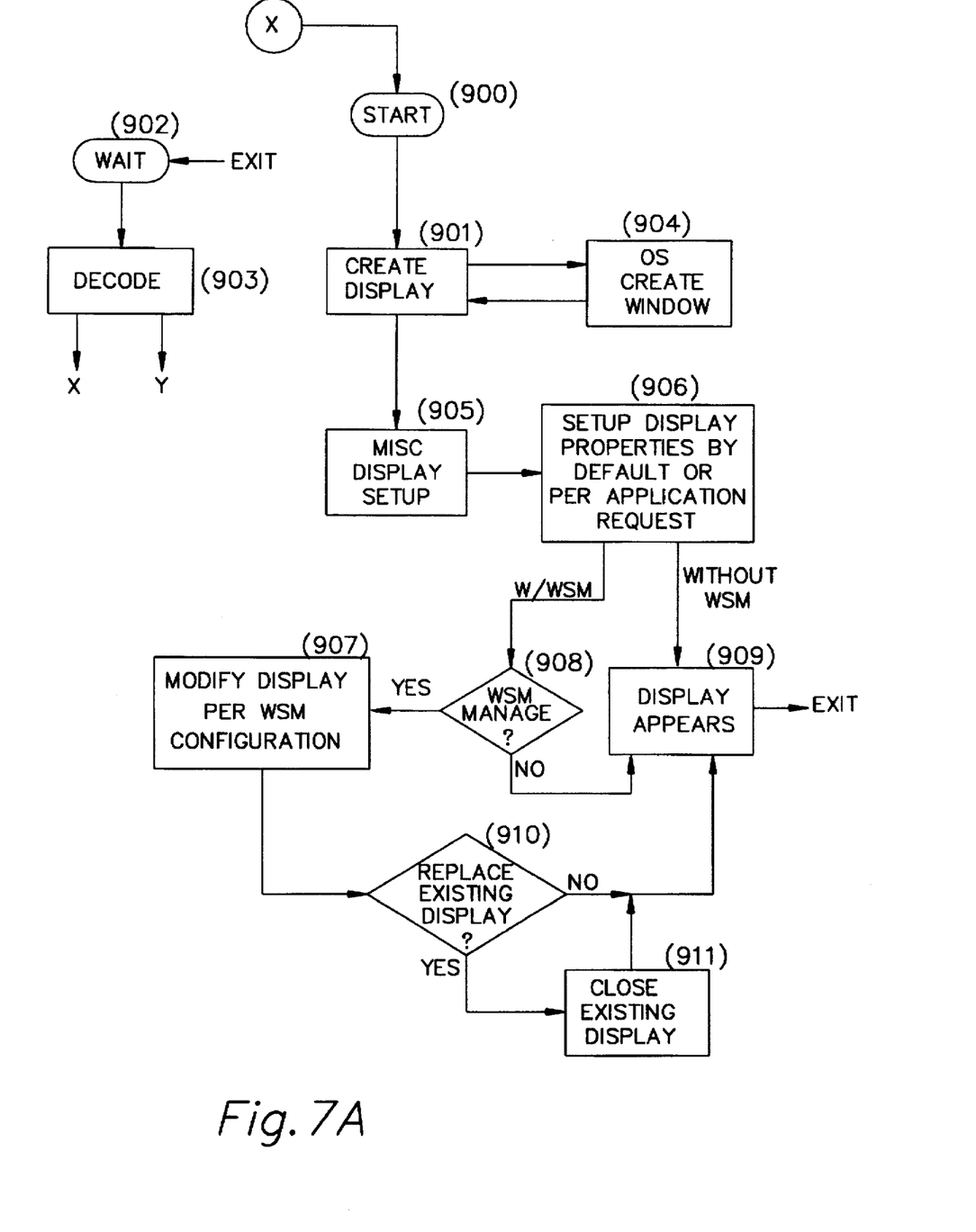
FIGS. 7A and 7B, shows a flow diagram of the WSM software operating in the Workspace Manager Display System in which the method for the present invention is utilized.
Figure 7B:
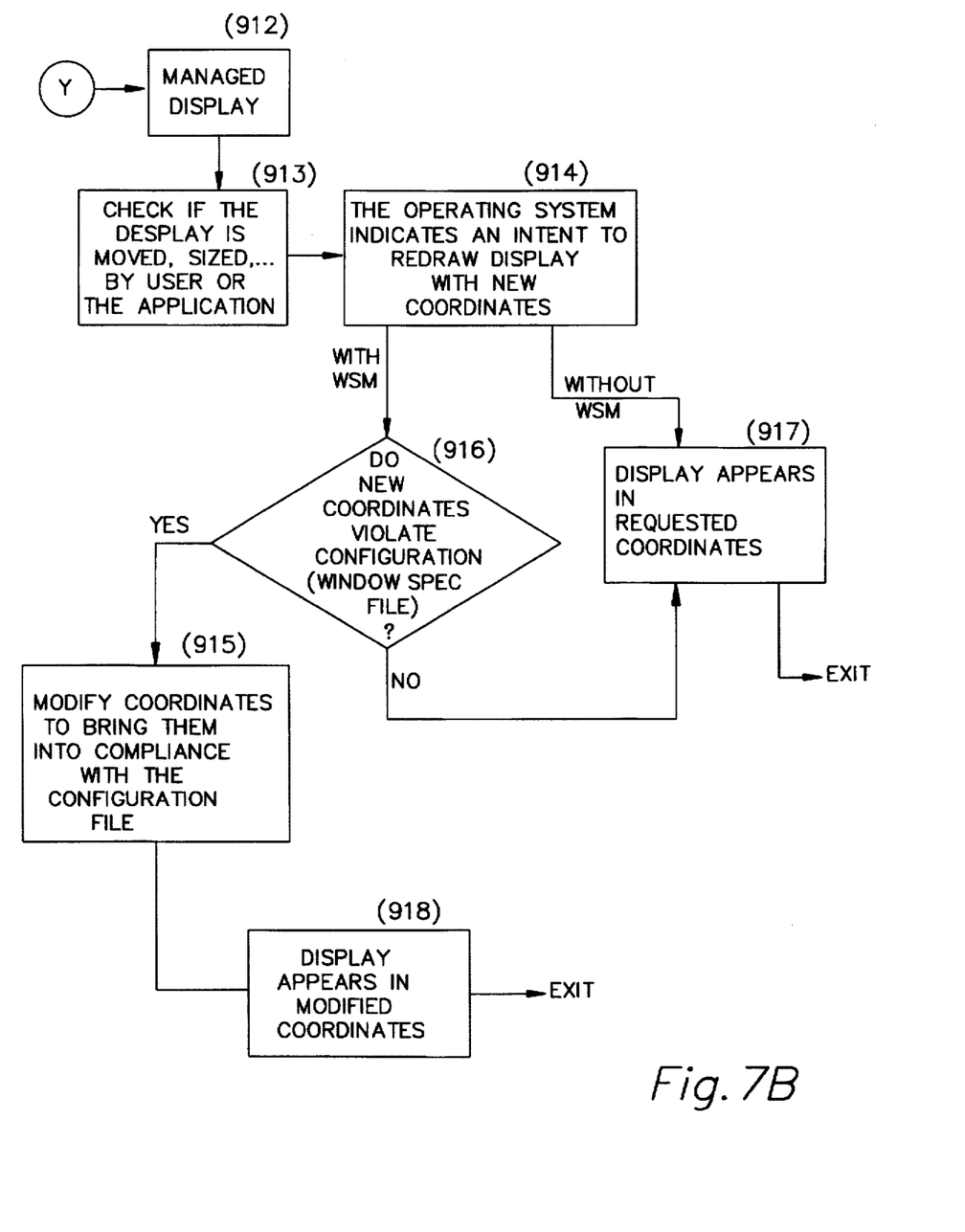

Referring to FIG. 7, which comprises FIGS. 7A and 7B, there is shown a flow diagram of the WSM software operating in the Workspace Manager Display System of the present invention. A display of an application is requested via the keyboard 126 (or via a mouse interface with a corresponding display, not shown). The program operating within the Workspace Manager Display System 124 is essentially waiting for an input (Block 902). Once the input is received via the keyboard (or via the mouse), the message is decoded (Block 903) and branches to point X (Block 900) if a new display window of an application is requested (Block 900), or branches to point Y in FIG. 7B if a current display is being operated on, or being manipulated (Block 912). The requested display is created (Block 901) and the operating system creates the window which incorporates the requested display (Block 904). Within the window, any miscellaneous request made by the operator is also set up in the display (Block 905); and if no specific display parameters have been requested, default conditions will be utilized to set up the display (Block 906). If the workspace manager is not involved (i.e., is not to manage the display) or is inoperative or is optionally turned off, the display as requested and as set up appears on the display screen of the display 125 (Block 909), and the program exits to wait state (Block 902). If, however, the workspace manager is to control the display (Block 908), the display is modified in accordance with the workspace manager configuration file (or sometimes referred to herein as the window specification file) (Block 907). The configuration file is stored within the Workspace Manager Display System 124 and is generated offline and contains the parameters which define the workspace area of the display screen. In particular, the location on the display screen is modified such that the requested display appears in the next available window of the Window 1, Window 2, . . . , Trend 1, . . . , or Alarm 1 . . . , in the example of FIG. 5. If the requested display is to replace an existing display (Block 910), the existing display is closed (Block 911) and the program continues to Block 909, in which the display appears in the controlled format and within the controlled, predetermined area, and the program then exits to the wait loop. If an existing display is not to be replaced, the program branches immediately to Block 909, the display appears, and the program exits to Block 902. In the preferred embodiment of the present invention, provision exists for replacing an old display with a newly-requested display. However, it will be understood by those skilled in the art that many variations can be made with the replacement of a display, such as having a priority associated with the display whereby a display of a lower priority cannot replace a display of a higher priority. In addition, displays may be marked by an operator as not being replaceable, . . . . It will be understood that many such features and variations thereof exist which are within the scope of the present invention.

If a display is being managed, i.e., operated on or modified (Block 912), the display is checked to determine if the operation is a move, size, stretch, . . . , being requested by the user or the application (Block 913). Before the application visually reflects the results of such an operation, the standard windows operating system (OS) of the WSM software signals its intent to redraw the display with the new coordinates (Block 914). If the display is being managed by the workspace manager, a determination is made whether the new coordinates violate the configuration file (the window specification file) (Block 916). If the coordinates are outside the configuration file, the coordinates are modified to bring them into compliance with the configuration file (Block 915). At Block 914, when the operating system redraws the display with the new coordinates and the display is not being managed by the workspace manager, the display appears in the requested coordinates (Block 917) and the program exits to the wait loop (Block 902). If the new coordinates in Block 916 do not violate the configuration file, the program proceeds to display the requested modified display in the requested coordinates (Block 917), and the program exits to the wait loop (Block 902). After the display modifies the coordinates in Block 915 to bring them into compliance with the configuration file, the display appears in the modified coordinates (Block 918) and the program exits to the wait loop (Block 902).

It will be recognized by those skilled in the art that the software of the program manager can be a completely new software package programmed to perform the functions as described in FIG. 7. Also, it will be recognized by those skilled in the art that the standard windows operating system (OS) can be utilized and modified in order to incorporate the features of the workspace manager display system as described herein. The window specification file, or configuration file, is a file stored within the WSM memory 135 of the WSM 124. There can be a plurality of configuration files to define various workspace configurations, including a four-window workspace; a five-window workspace, which is similar to a four-window workspace with the fifth workspace having a critical space (or group); a ten-window, three-group workspace, as shown in FIG. 5, . . . . Each entry into the configuration file includes the size of the window, the position of the window, . . . , and/or other characteristics which define the parameters and properties of the window. Although the applications being displayed in the preferred embodiment are process-control related, it will be further understood by those skilled in the art that the application can be any application being monitored, e.g., financial applications when financial systems are being monitored, manufacturing plant operations when utilized in manufacturing operations, . . . .

Figure 8:
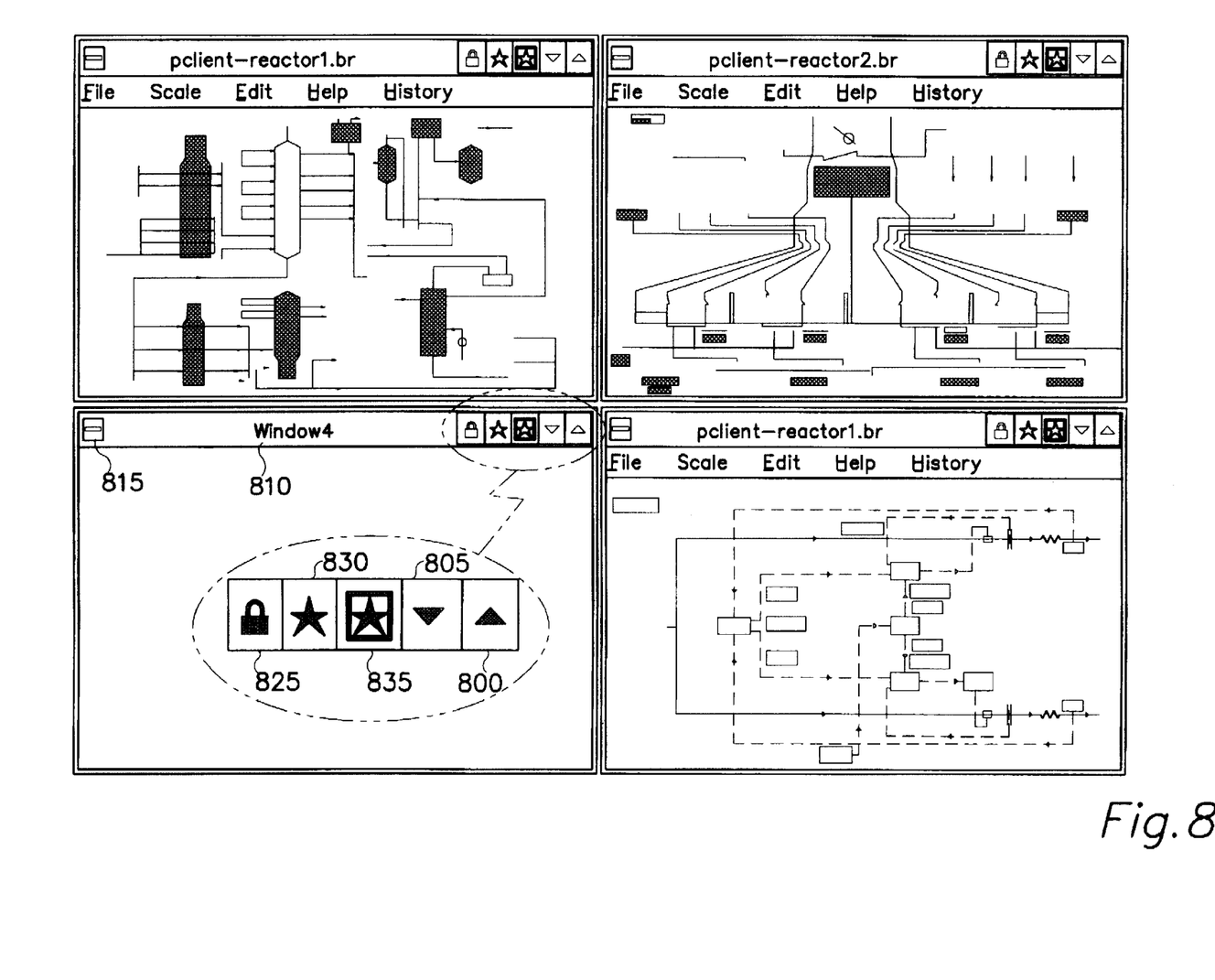
FIG. 8 shows an example of a four- (4) window display of a multi-window display including the additional options in the title bar as provided by the present invention.

Referring to FIG. 8, there is shown, for example, a four- (4) window display of a multi-window display, including the additional options in the title bar as provided by the present invention. In this example, three "viewports" are occupied holding managed displays, and one remaining viewport is empty. The title bar includes the name of the application, or in the case of the empty viewport, the name of the viewport specified in the configuration file if the placehold option is enabled. The maximize (MAX) button 800 and the minimize (MIN) button 805 are included in the title bar 810. The "normal" control-menu box 815 is also included.

The present invention makes additional buttons available in the title areas of managed windows. These buttons provide the operator with information regarding the replacement of current displays with subsequent displays. They also provide the operator a level of control as to whether one or more displays should not be replaced, or if a particular display should be replaced.

A lock button 825 appears with a small "padlock" icon and is only available for windows in round-robin groups (described above). Pressing this button informs the Workspace Manager to avoid this window when applying its automatic first in/first out approach to replacing existing displays as new displays are presented in a round-robin group. The operator can see from the color change and the depressed button whether a window is locked. To unlock a window, the operator simply re-selects a locked window button. Lock buttons are always available to the operator, but the operator cannot lock all of the windows in a round-robin group. If only one unlocked window remains, its lock button is disabled (grayed) so that it cannot be selected. Thus, there is always some place for new displays to go.

An output focus button 830 appears as an asterisk, "*", and is available for windows in round-robin and manual-select window groups (described above). Pressing this button informs the Workspace Manager to replace this display with the next display which is managed according to the window's group. A selected output focus button changes color and appears in the depressed state, providing visual feedback as to which windows will be replaced by new windows. If more than one round-robin or manual-select window group exists, there will be more than one output focus available, one per each window group. There is only one output focus window (with depressed output focus button) per window group at any one time. (Global output focus can temporarily override all other groups' local output focus windows and is described below.) In round-robin window groups, the output focus button is automatically "moved" from one window to the next upon each new display which is presented as part of this window group. This occurs as the system automatically selects the least-recently-used (unlocked) window as the replacement target for the next display presented in this group. In round-robin groups the operator can at any time manually "reset" the current output focus by simply selecting this button on any window in the group. (However, note the exception below with the selection of any global output focus button.) If the operator selects the output focus button of a locked window, the lock button is automatically deselected, allowing the window to receive the next invoked display. In manual-select groups, as the name suggests, the operator is responsible for selecting the output focus window, which remains so until the operator selects another window for output focus. That is, all new displays in a manual-select group replace the existing output focus display until the operator selects another output focus. Because window selection is manual for manual-select groups, there is no lock button on windows of these groups.

The global output focus button 835 is available on all managed windows of all group types: round robin, manual select, and first match. This button, which appears with an asterisk, "*", surrounded by a rectangle, allows the operator to override the workspace configuration's normal display organization. This button, when depressed, gives this window the status of "global output focus window." As long as this button is left depressed, the system will cause newly-invoked displays to replace this global output focus window, regardless of whether or not the new displays normally would be managed in this window's group. This allows, for example, the operator to view a Trend display in a window normally reserved for, say, Schematic displays. There need not be any window selected as the global output focus window, but at most only one window may be so designated. This status remains with a given window until the operator either selects another window to be global output focus or until the operator deselects the global output focus status of the current window by pressing the depressed global output focus button for that window. If the operator selects a window's global output focus button while another's is depressed, that other window's global output focus button is automatically deselected. Selection of any global output focus button causes all other output focus buttons to be temporarily deactivated (grayed) until no global output focus button is depressed. (Even if the other output focus buttons are deactivated, the operator can still see which of these windows have output focus status, because the deactivated output focus buttons, though grayed, are still displayed in their depressed state.)

While there has been shown what is considered the preferred embodiment of the present invention, it will be manifest that many changes and modifications can be made therein without departing from the essential scope and spirit of the invention. It is intended, therefore, in the annexed claims to cover all such changes and modifications that fall within the true scope of the invention.

We claim:

1. In a multi-window computer environment including a display system having a display surface of one or more physical surfaces, a method of controlling the presentation of application displays in said multi-window computer environment wherein multiple application displays are displayed, and further wherein any application display requested to be displayed is caused to be displayed by said method in one of the multi-windows in response to an operator select action, the method comprising the steps of:

a) selecting and outputting a lock option from a plurality of selectable options for each window as specified in a configuration file, the configuration file defining window properties for each window of said multi-window, computer environment the selectable options providing indications of where the application displays are to be presented;

b) reading the lock option selected; and c) outputting the application display to conform with the lock option selected, thereby prohibiting a next-requested display to be presented from replacing the display having the lock option selected.

2. In a multi-window computer environment including a display system having a display surface of one or more physical surfaces, and each window of said multi-window computer environment arranged to display therein one or more application displays of a like group, a method of controlling the presentation of said application displays in said multi-window computer environment wherein multiple application displays are displayed, and further wherein any application display requested to be displayed is caused to be displayed by said method in one of said windows in response to an operator select action, the method comprising the steps of:

a) selecting and outputting an output focus option from a plurality of selectable options for each window as specified in a configuration file, the configuration file defining window properties for each window of said multi-window computer environment, the selectable options providing indications of where the application displays are to be presented;

b) reading the output focus option selected; and c) outputting the application display to conform with the output focus option selected, thereby selecting the window in which a next-requested display having the same group is to appear.

3. In a multi-window computer environment including a display system having a display surface of one or more physical surfaces, and each window of said multi-window computer environment arranged to display therein one or more application displays of a like group, a method of controlling the presentation of said application displays in said multi-window computer environment wherein multiple application displays are displayed, and further wherein any application display requested to be displayed is caused to be displayed by said method in one of said windows in response to an operator-select action, the method comprising the steps of:

a) selecting and outputting a global output focus option from a plurality of selectable options for each window as specified in a configuration file, the configuration file defining window properties for each window of said multi-window computer environment, the selectable options providing indications of where the application displays are to be presented;

b) reading the global output focus option selected; and c) outputting the application display to conform with the global output focus option selected, selecting the window in which a next-requested display is to appear independent of the group of the next-requested display.

* * * * *